United States Patent [19]

Young, Jr.

[11] 3,841,171
[45] Oct. 15, 1974

[54] SUPPORT FOR FLEXIBLE CONTROL DEVICE

[75] Inventor: Don L. Young, Jr., Florissant, Mo.

[73] Assignee: The United States of America as represented by the Secretary of the Air Force, Washington, D.C.

[22] Filed: Aug. 28, 1973

[21] Appl. No.: 392,383

[52] U.S. Cl. .................... 74/501 R, 74/502, 64/2 R
[51] Int. Cl. ............................................. F16c 1/10
[58] Field of Search ........ 74/501, 502, 503; 64/2 R, 64/2 P, 3

[56] References Cited
UNITED STATES PATENTS 3,128,637    4/1964    Richoux .......................... 74/501 R
3,509,782    5/1970    Molnar ............................ 74/501 R Primary Examiner—Samuel Scott
Assistant Examiner—Frank H. McKenzie, Jr.
Attorney, Agent, or Firm—Harry A. Herbert, Jr.; Richard J. Killoren

[57] ABSTRACT

A flexible push-pull control device having portions of the ball separators removed to receive structural support members for supporting the load carrying element. The structural support members are secured to the end anchor pieces and extend down along the sides of the load carrying member at the end regions of the flexible control device.

4 Claims, 9 Drawing Figures

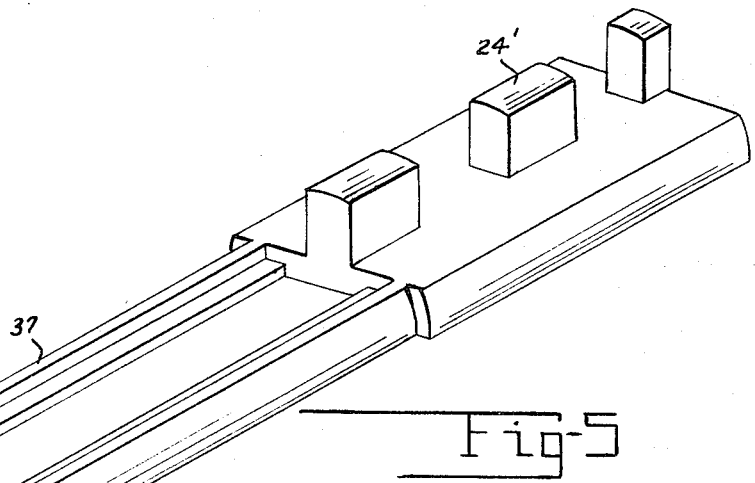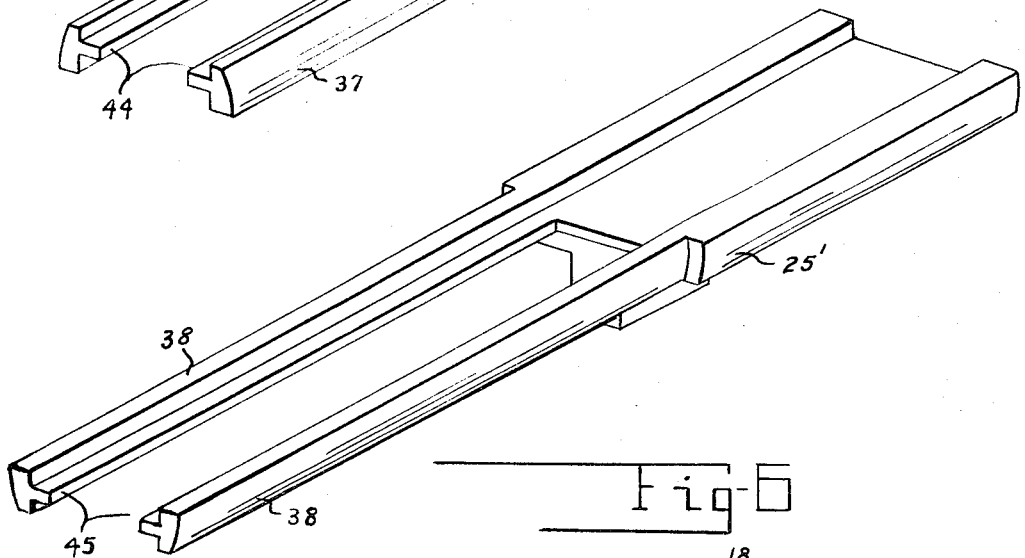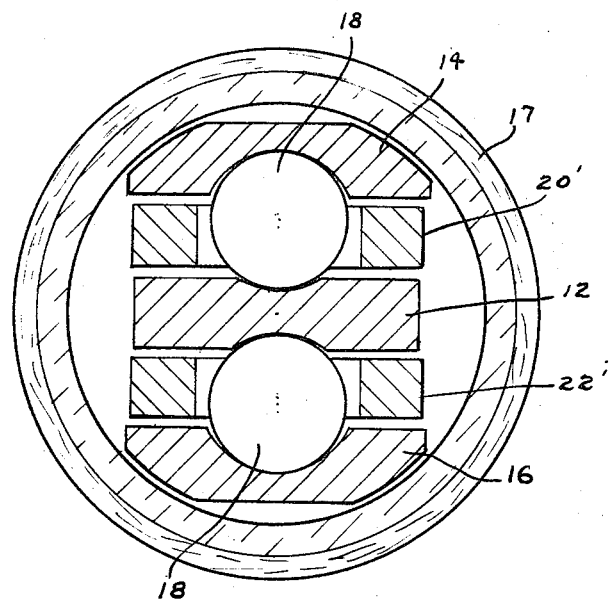

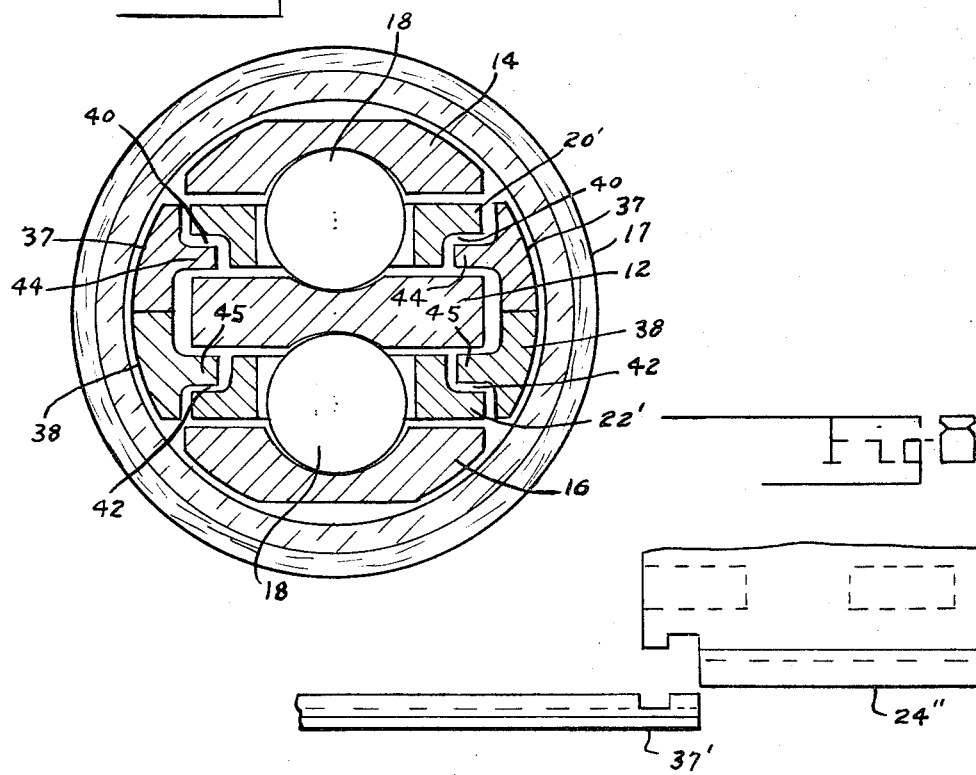
Fig-7
Fig-8
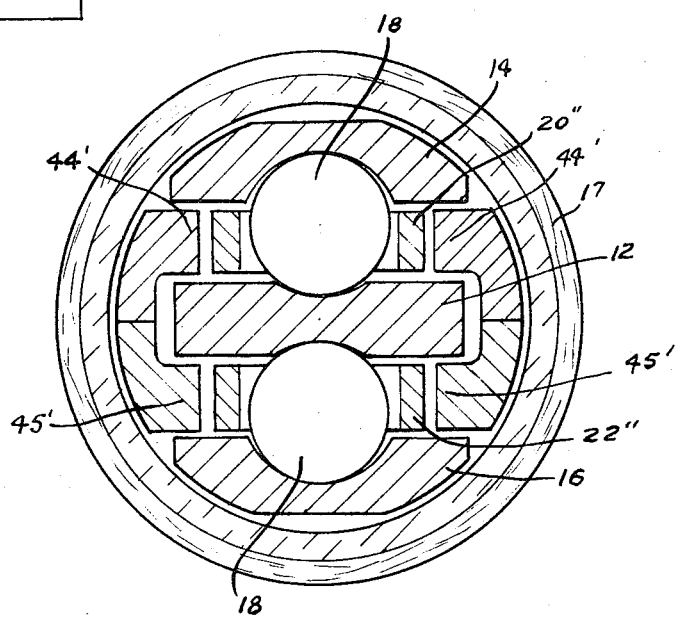
Fig-9

SUPPORT FOR FLEXIBLE CONTROL DEVICE

BACKGROUND OF THE INVENTION

In flexible push-pull control devices, used to transmit a control from a driver at one end to a driven member at the other end, the load carrying element is normally designed to be a flexure element and therefore it has little column capability. Due to the movement in the control device, there will be a portion at the ends, that is not supported by the balls, which will tend to collapse under compression loads and will thus cause a certain looseness in the control response.

BRIEF SUMMARY OF THE INVENTION

According to this invention, portions of the ball separators are removed and structural support members are attached to the end anchor pieces. The structural support members have projections that fit into the space of the removed portion of the ball separators and provide support for the load carrying element. The structural members may be made integral with the anchor pieces or as separate members attached to the anchor pieces.

IN THE DRAWINGS

FIG. 4 is an enlarged isometric view of one of the anchor pieces and support members of the device of FIG. 3.

FIG. 5 is an enlarged isometric view of the other anchor piece and support members of the device of FIG. 3.

FIG. 6 is an enlarged sectional view of the device of FIG. 3 taken along the line 6—6.

FIG. 7 is an enlarged sectional view of the device of FIG. 3 taken along the line 7—7.

FIG. 8 is a side elevation of a modified anchor piece and support members according to another embodiment of the invention.

FIG. 9 shows a sectional view corresponding to the showing in FIG. 6 of a modified support member according to a further embodiment of the invention.

Figure 1:
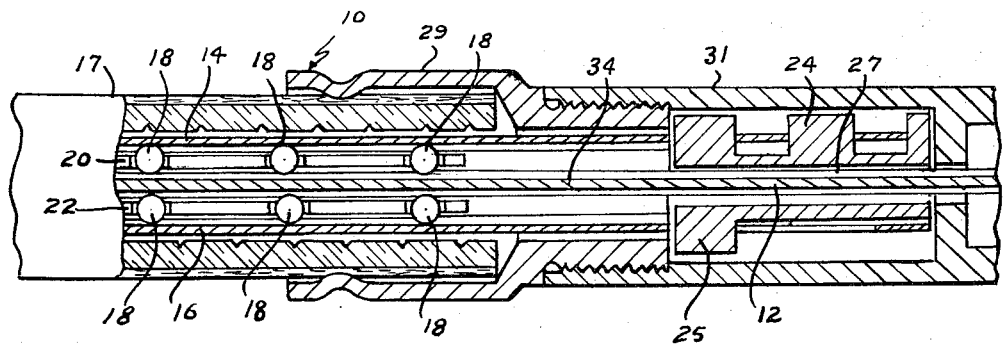
FIG. 1 is a partially cut away view of a prior art flexible control device.

Reference is now made to FIG. 1 of the drawing, which shows a conventional flexible push-pull control device 10 having a load carrying member 12 positioned between two race strips 14 and 16, within a flexible housing 17. A plurality of balls 18, with ball separators 20 and 22 are positioned between the load carrying member 12 and the race strips 14 and 16. The strips 14 and 16 are attached to anchor members 24 and 25 with the load carrying member 12 passing through channel 27 formed between anchor members 24 and 25. An end member 29 is secured to the flexible housing member 17 and has an anchor-member retainer 31 threaded to it.

Figure 2:
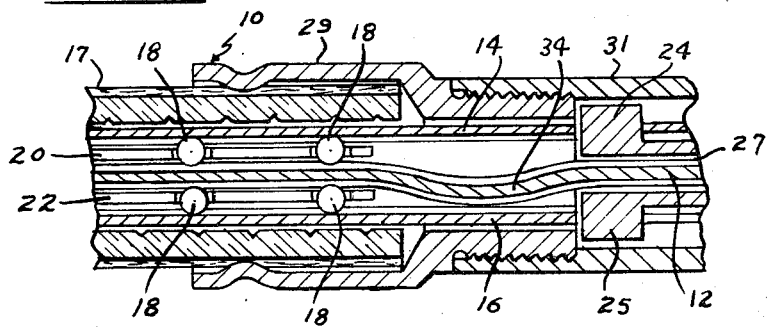
FIG. 2 shows the device of FIG. 1 under a compression load.
Figure 3:
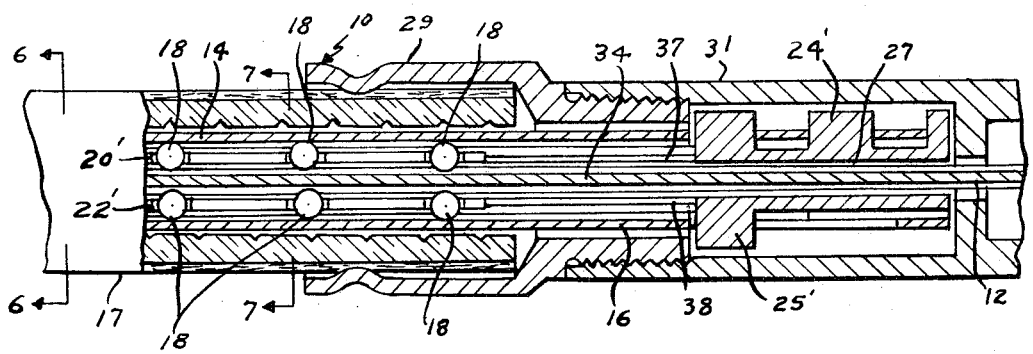
FIG. 3 shows the device of FIG. 1 with the support members of the invention attached to the anchor pieces.

As the load carrying member 12 is moved within the flexible housing member, an unsupported length 34 is left at the ends of the control device (only one end shown). Under compression loads, the unsupported length 34 will tend to flex, as shown in FIG. 2, which will cause a looseness in the control.

According to this invention, a pair of structural support members 37 are attached to the anchor member 24', as shown in FIG. 4, and a pair of structural support members 38 are attached to the anchor 25', as shown in FIG. 5. The ball separators 20' and 22', shown in greater detail in FIG. 6, are modified, as shown in FIG. 7, by providing cut out sections 40 and 42 at the end portions of the separators. Projections 44 and 45 on the structural support members 37 and 38 fit into the cut out sections 40 and 42 to provide support for the load carrying member 12.

The support members 37 and 38 could be made integral with the anchor members 24' and 25' or they could be made separate, as shown in FIG. 8 wherein support member 37' is shown as keyed to anchor member 24''. The support members can be made of the same material as the anchor members or they could be made of non-metallic material.

Also, the end portion of the ball separators could be modified, as shown in FIG. 9, with the projections 44' and 45' being made to fill the entire space between member 12 and the outer race strips 14 and 16. This will provide added support for the race strips, 14 and 16, which may have some tendency to bend under tension loads as well as the load carrying member 12.

There is thus provided support apparatus for the end portions of the load carrying member in a flexible push-pull type control device.

I claim:

1. In a flexible push-pull device, adapted to transmit a control from a driver at one end to a driven member at the other end, having a flexible housing; a load carrying member within the housing; said load carrying member including means forming a central race, a pair of outer race strips positioned adjacent said load carrying member; anchor members at the ends of the control device for securing said outer race strips within the housing; said anchor members having a channel therebetween for the passage of the load carrying member; a plurality of roller balls positioned on opposite sides of the load carrying member, between the load carrying member and the outer race strips; a ball separator positioned between the load carrying member and each of the outer race strips; wherein movement of the load carrying member within said housing leaves a portion at the ends of the control device unsupported by the balls and outer race strips; a support for the unsupported end portion of the load carrying member: comprising a pair of structural support members attached to each of said anchor members and extending a predetermined distance along the sides of said load carrying member adjacent the ends of the control device; each of said structural support members having a projection thereon positioned adjacent the load carrying member between the load carrying member and the outer race strip; said ball separators having cut away portions adapted to receive said support member projections.

2. The device as recited in claim 1, wherein the projections on the structural support members extend part way between the load carrying member and the outer race strips; said ball separators having portions extending between the projections on the structural support members and the outer race strips.

3. The device as recited in claim 1 wherein the projections on the structural support members extend substantially from the load carrying member to the outer race strips.

4. The device as recited in claim 1 wherein said structural support members are separate elements keyed to the anchor members.

* * * * *